United States Patent [19]

Gusovius

[11] 3,832,058
[45] Aug. 27, 1974

[54] PROCESS AND APPARATUS FOR SETTING A REPRODUCTION CAMERA

[75] Inventor: Eckart Gusovius, Auwiese, Germany

[73] Assignee: Thefiem "Dr. Boger Diplomat Apparate KG", Holstein, Germany

[22] Filed: Mar. 26, 1973

[21] Appl. No.: 344,882

[30] Foreign Application Priority Data
May 25, 1972  Germany............................ 2225416

[52] U.S. Cl..................... 355/56, 353/76, 354/198, 355/61
[51] Int. Cl........................ G03b 3/10, G03b 27/34
[58] Field of Search.............................. 355/52–61; 354/195, 198; 353/76; 352/140

[56] References Cited
UNITED STATES PATENTS
3,735,686  5/1973  Brewer et al. ..................... 355/56 X Primary Examiner—Richard A. Wintercorn
Attorney, Agent, or Firm—Oswald H. Milmore

[57] ABSTRACT

A reproduction camera has a carrier for a replaceable objective lens and a carrier for the image plane, both carriers being movable to different distances from a copy holder by electric motors, and an electronic digital computer, which determines the actual distances of the carriers from the holder by counting electrical pulses generated upon incremental movements of the carriers (as by pole passages of the motors, or directly); the desired distances for sharp focus, corrected for T (distance of the objective lens from the objective carrier) and HH' (distance between principal focal points) are computed on the basis of the desired magnification and the focal length of the selected lens, and are compared with the actual distances; and the motors are controlled as the results of the comparisons of the actual and the desired distances.

21 Claims, 6 Drawing Figures

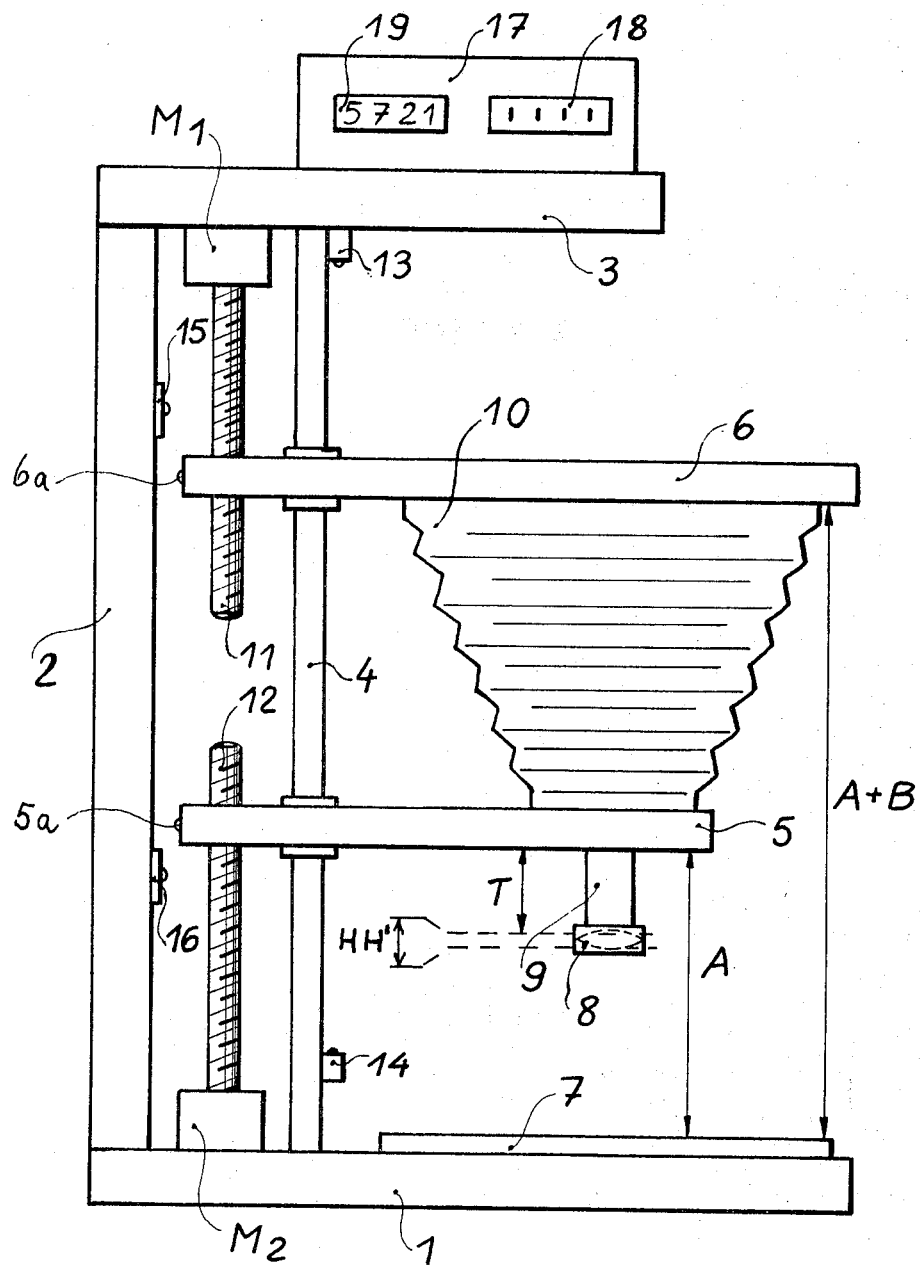

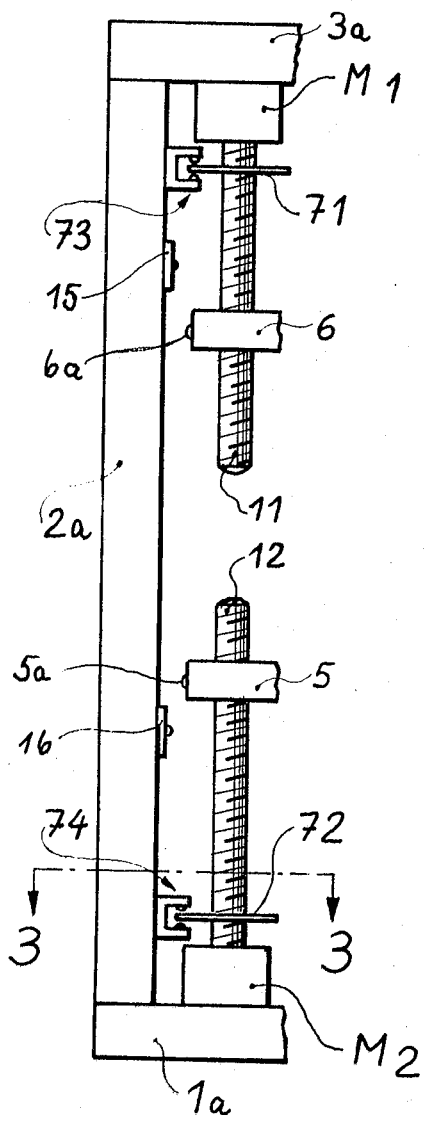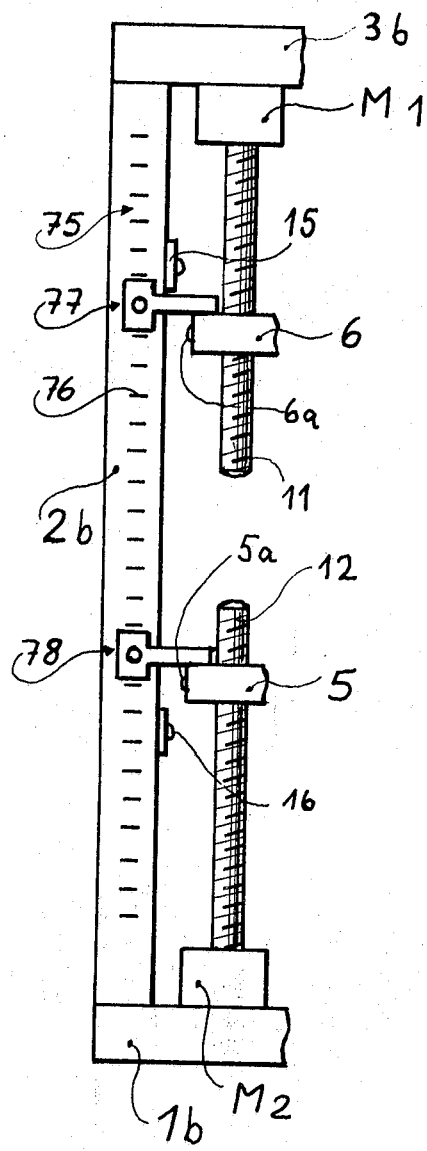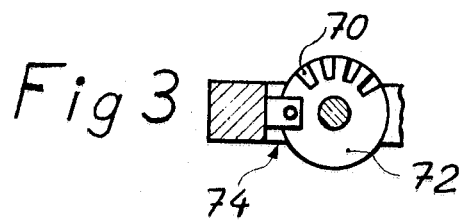

PROCESS AND APPARATUS FOR SETTING A REPRODUCTION CAMERA

The invention relates to a process and to an apparatus for setting the enlargement and the focus of a reproduction camera which is equipped with an objective lens replaceable by lenses of different focal lengths and/or of different constructions, e.g., having the objective lens mounted at different distances from the carrier of the objective lens or having objective lenses of different thicknesses. Such cameras are provided with carriers for the objective lens and for the picture or image plane (at which the photo-sensitive sheet is located), the carriers being positionally adjustable by means of electrical motors and mechanical drives to proper distances from a copy holder, which may be stationary.

As used herein, the term "reproduction camera" includes, in addition to the optical elements, the various elements for setting it; and the term "enlargement" or "magnification" indicates the relative sizes of the image and copy, and may be greater than, equal to or smaller than unity.

In known processes and reproduction cameras in this art the electrical motors are controlled by hand to advance or retract one or both of the carriers, and the operator must control the motors to make them turn in the proper directions and must stop them at the correct positions. He must read the actual carrier positions from scales provided on the camera. Thereafter he must compare these read values with the theoretically correct (herein called the "desired") values for these distances, which are determined from data pertaining to the enlargement to be made and the focal length of the objective lens, usually corrected for the length of the tube holding the objecting lens an offset distance from the carrier and for the lens thickness.

For the production of high-quality reproductions, the distances from the copy holder to the objective carrier and to the image plane carrier must be set precisely, and setting to within one or a few hundredths of a millimeter is often desirable. Thus, it was found that variations in these distances as small as a few tenths of a millimeter cause a visually noticeable decrease in quality. The desired distances are, however, in practice usually determined from tables with suitable computer aids, which normally permit only comparatively inexact distances to be determined, for reasons of speed in the determinations and easy checking of the determined distances, and because the determined distances are usually rounded off. A special difficulty encountered in prior practice is that the determinations as well as the settings of the carriers are usually performed in darkness. Therefore, for the correct adjustment of the distances it was heretofore desirable to provide the camera with a view finder fixed to the image carrier, through which the copy could be viewed.

There are also known devices for setting reproduction cameras in which the carriers, which determine the actual distances from the copy, are interconnected by a mechanical or an electro-mechanical connection. This connection is intended to be so arranged that the camera always remains in sharp focus, and only the enlargement needs to be set by hand. Such connections, however, are not capable of setting the carriers to the degree of accuracy that the view finder could be eliminated. An example of a camera using an electromechanical connection is described in the German patent specification No. 1,023,665, wherein the enlargement is determined by a manually positioned objective carrier and the image plane carrier is set by an electric motor controlled by a relay operated through a resistance bridge; this arrangement does permit the exact positioning of the latter carrier.

In common to prior processes and apparatus are the fact that they are slow in operation and are usually complicated, and that only experienced technicians could accomplish precise settings, and this only by the expenditure of considerable time.

OBJECTS

The principal object of the invention is the provision of a process and of an apparatus for setting reproduction cameras for different enlargements or magnifications, which makes possible the precise setting of the camera without any visible control and which permits rapid, simple and practicable operation.

A related object is to provide such a process and apparatus which is suitable for cameras having replaceable objective lenses, which may have different focal lengths and may, in many cases, differ from each other in structural features such as the length of the tube holding the lens and/or the lens thickness.

A further object is the provision of such a process and apparatus wherein the desired values of the distances of the carriers from the copy holder are computed from data for the desired magnification, focal length and construction of the selected lens, the actual positions of the two carriers from the copy holder are determined, these actual positions are compared with the desired values, and the carriers are moved by electric motors in accordance with the results of these comparisons, all computations, determinations of the actual positions and comparisons being performed in an electronic digital computer.

SUMMARY

The objects are achieved by computing digitally the desired distances $a$ and $(a+b)$ (corrected, if necessary, for the replaceable lens used); determining separately and digitally the actual distances of the carriers from the copy holder or relatively to defined positions, these distances being A and $(A+B)$, respectively; comparing $a$ with A and $(a+b)$ with $(A+B)$ continually (continuously or after each addition to determine A and $(A+B)$; operating electric motors in accordance with the results of the comparisons to move the carriers toward their desired distances from the copy holder; and stopping the motors when equalities between the computed desired and the determined actual positions exist. Of course, as a variant, the distance $b$ between the carriers may be computed instead of $(a+b)$ and compared with the actual value B. The actual positions of the carriers are determined by counting digitally the revolutions or fractions of revolutions made by the motors or parts driven thereby which position the carriers, or the steps or incremental distances by which the carriers move.

In explanation, although the invention is not limited to any particular formula, it may be noted that usually, for a selected lens having a focal length $f$ and for a magnification $m$, it is desired, for a thin lens situated at the objective carrier, that the distance from the copy holder of said carrier be: $a = f(1 + 1/m)$; and that the distance from the copy holder to the image plane carrier be: $(a+b) = f(1 + 1/m) + f(1 + m)$.

The apparatus of the invention comprises a copy holder, a frame having slide means for moving the objective lens and the image carrier to different distances from the copy holder, electric motors having mechanical connections to the carriers for reversibly moving the carriers, an electronic digital computer for performing the foregoing computations, additions (either positively or negatively) for determining the actual carrier positions, means for supplying pulses to the adding means in accordance with the movements of the carriers (or their drive means), means for controlling the counting operations either positively or negatively, and means for causing the motors to turn in the proper directions and for stopping them at the proper positions of the carriers.

The foregoing process and apparatus make it possible, because of the rapid digital operations, to effect any desired exactness in the setting of the camera, specifically, of the two carriers. Thus, by a suitable choice of the mechanical positioning connection, as by a choice of the gear ratio and/or the pitch of the threads on the rotatable positioning shafts, the positions of the carriers can be given any desired degree of precision. This precision can be made so high that the camera can be set to complete sharpness of the image without any use of a view finder or similar focus-sensing means. They can, therefore, be practiced and used by personnel who are not trained in photographic technology or have poor vision. Further, an electronic digital computer is well suited to performing the computations, counting, and effecting the comparisons, and, further, controlling the motors and giving an indication of when the setting is correct, whereby the exactness of the carrier positions as well as the comfort of the attendant are enhanced.

The foregoing corrections to the desired distances may involve adding the corrections algebraically to the computed desired distances. Thus, a distance equal to T (the tube length from the objective carrier to the principal point of the lens) and, for a thick lens, a distance equal to HH' (the distance on the principal lens axis between the first and second principal points) can be added to the computed distances $a$ and $(a+b)$, respectively. When thick lenses having two principal points are involved, the point near to or toward the copy is taken for $f$.

DRAWINGS

Additional advantages will become apparent from the following detailed description of certain preferred embodiments, which is is made with reference to the accompanying drawings, wherein:

FIG. 1 is an elevation of a camera according to the invention;

FIG. 2 is a fragmentary elevation of the frame according to a second embodiment;

FIG. 3 is a section taken on the line 3—3 of FIG. 2;

FIG. 4 is a fragmentary elevation of the frame according to a third embodiment;

DETAILED DESCRIPTION — FIRST EMBODIMENT

Figure 5:
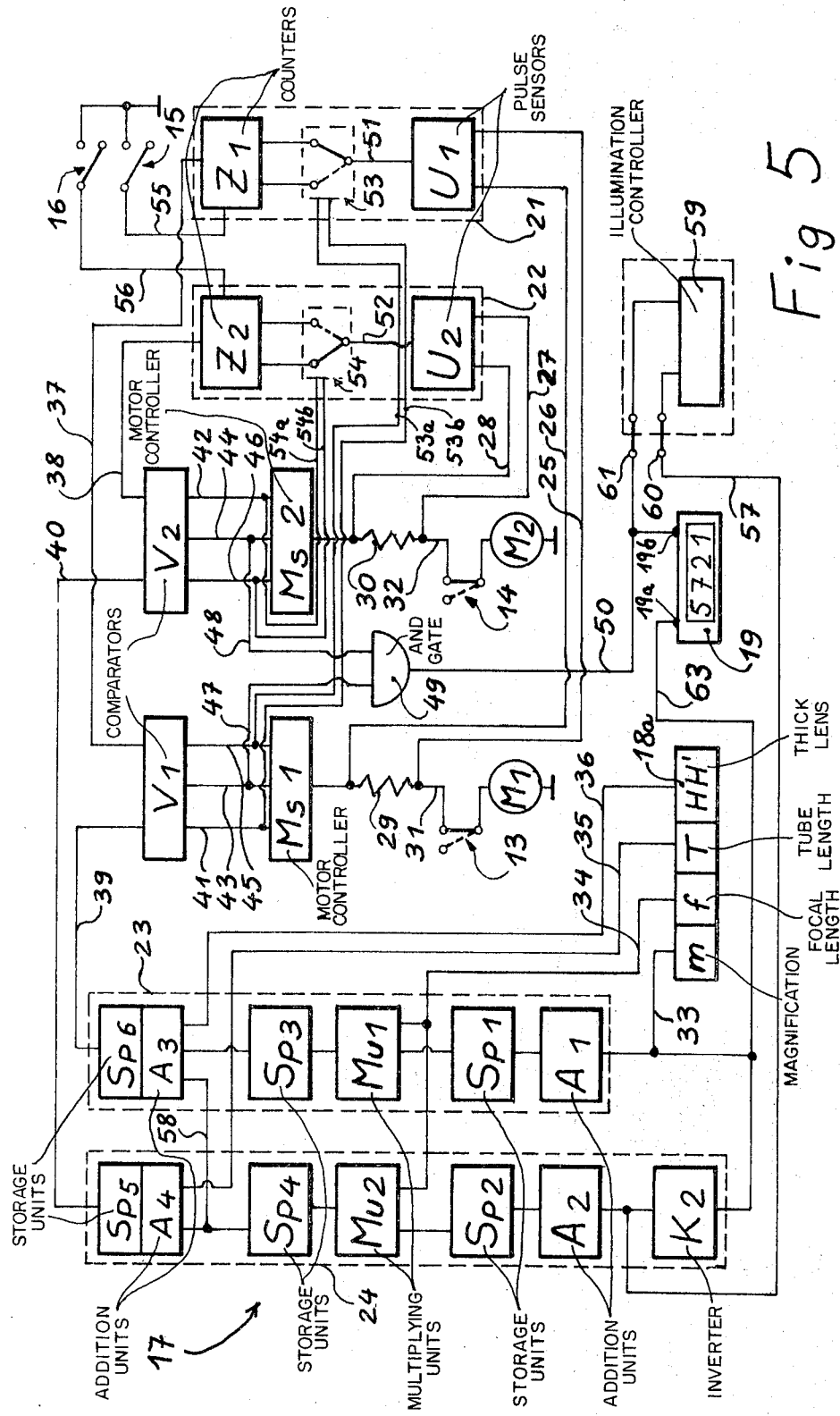
FIG. 5 is a block diagram of an electronic computer forming a part of the camera and suitable for the process.

Referring to FIG. 1, the reproduction camera includes a frame having a fixed base 1, a vertical column 2 and an upper platform 3, a smooth slide bar 4 being mounted between the base and the platform. An objective carrier 5 and a carrier 6 of the image plane are mounted for sliding vertical movements on the bar 4, which may have non-circular mating parts to maintain the carriers oriented. A copy holder 7 is fixed to the base 1. A replaceable objective lens 8 is attached to the carrier 5 and spaced therefrom by a tube 9 at a distance T from the carrier. The lens is shown as a thick lens having a distance HH' between its nodal points. It is understood that both T and/or HH' may have any values. A bellows 10 is mounted in the usual manner between the two carriers. It is understood that the camera has other devices, not shown, such as a diaphragm, shutter, lamps for illuminating the copy, etc.

Reversible electric motors $M_1$ and $M_2$ drive the carriers 6 and 5, respectively, slidably on the bar 4 as through externally threaded positioning shafts 11 and 12. These shafts are secured against axial displacements and are fixed rotationally to the output shafts of the motors, and engage internal threads in the carriers. Normally closed limit switches 13 and 14 are fixed to the frame and are connected in series with the electrical circuits to these motors, adapted to be opened when engaged by the carriers. These switches prevent damage to the camera parts, including the carriers, in the event of an error in the camera or in the computer operation.

Figure 6:
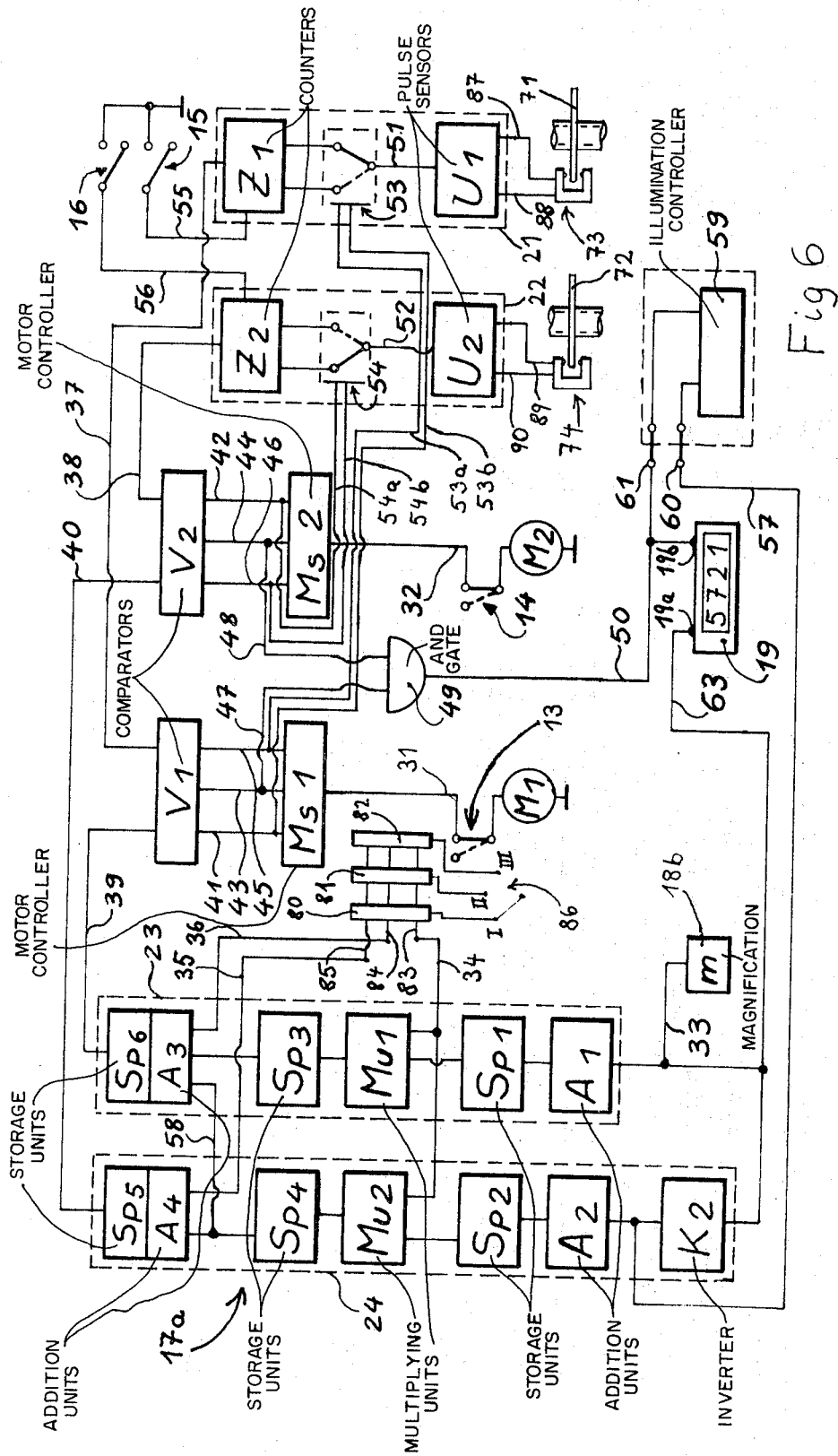
FIG. 6 is a block diagram of another electronic computer which is especially suited for use in connection with the second and third embodiments.

Position signalling switches 15 and 16 are mounted on the column 2 at heights within the ranges of movements of the carriers and are operated (either closed or opened, depending upon the circuitry in the computer, circuits for normally open switches being shown in FIGS. 5 and 6) by protrusions 6a and 5a on the carriers. The computer 17 is supported by the platform 3 and has digital indicating wheels 18 and 19. The former shows the input data, such as $f$, $m$ and, when applicable, T and HH', which are set manually by dials, not shown. Some of these items, especially the last two, need not be displayed and may, when constant, be built into the computer. The readable wheel 19 shows the magnification used in the computation and shows, by a steady light, that the camera has been properly set. Additional indicators 19 may be used.

According to the invention, the camera is set as follows: The turns, or fractions of turns, of the positioning shafts 11 and 12, driven by the reversible motors $M_1$ and $M_2$, generate electrical pulses which are counted, e.g., by pole passages of the motor commutators past their brushes, or by means sensing the rotations of the shafts, or sensing incremental movements of the carriers, counting being additive or subtractive depending on the direction of rotation or movement. The countings may have their origins corresponding to the carrier positions when switches 15 and 16 are closed (movements to both sides of these switches being possible), but determined distances are from the copy holder. The locations of the carriers when the switches are operated are known and counts are built into the computer. Each pulse corresponds to an increment of travel of the corresponding carrier and, if it does not give the distance directly, the current sums of pulses are continually converted into distances to give the actual locations of the carriers from the copy holder. Thereby the actual values of A and of (A + B) are always known.

The desired values of $a$ and of $(a + b)$ are computed from the data previously mentioned, e.g., using the above-given equations. When the objective lenses require corrections in these values, the desired distances become $(a + T)$ and $(a + b + HH')$, respectively. In using these equations, the following computation procedure is followed: From $m$, its reciprocal $1/m$ is found; then 1 is added, to obtain $a' = 1 + 1/m$, and $a'$ is temporarily stored; it is then multiplied by $f$ to yield $a = a'f$, and the value of $a$ is stored. The distance $b$ is computed analogously, but omitting the first step, resulting in: Addition of 1 to $m$ to give $b' = 1 + m$, which quantity is temporarily stored; and then multiplying $b'$ by $f$ to yield $b = b'f$, which is stored.

Finally, $a$ and $b$ are added to obtain $(a + b)$, which sum is stored. Corrections, if applicable, are made by adding T to the former value to yield $(a + T)$ and HH' to the latter value to yield $(a + b + HH')$. Both of these values are stored.

The determined distances of the actual carrier positions are separately compared to the computed desired distances, to obtain indications of equalities or inequalities and, in the latter cases, whether the arithmetical sign of the difference was positive or negative, during the last comparison.

The motors $M_1$ and $M_2$ are energized to rotate in the proper directions to reduce the differences in the compared values. The motors are individually stopped when the difference is zero. Equality in the comparisons means that the carriers 5 and 6 are at their theoretically correct distances from the copy holder 7. As was noted above, these computing, adding and comparing steps are performed in an electronic digital computer, which preferably also performs the function of controlling the motors. These operations can be made so precise that the need for an optical view finder or other visual sharpness-determining means is obviated.

One form of the electronic digital computer is shown in block diagram in FIG. 5. The computer 17 comprises two separate first computing sections, enclosed in dashed lines 21 and 22, for determining the present positions of the carriers 6 and 5, respectively, and two separate second computing sections, enclosed in dashed lines 23 and 24, for computing the desired distances of these carriers from the copy holder and, when appropriate, adding the corrections of T and HH'.

The pulse inputs to the first sections are by circuit pairs 25, 26 and 27, 28, respectively, each pair being connected across a resistance element 29 or 30 which is in series with the power circuit to the motor $M_1$ or $M_2$. The units $U_1$ and $U_2$ sense the pulses in the circuit pairs and transmit corresponding, reformed pulses via circuits 51 and 52 and switches 53 and 54 to counters $Z_1$ and $Z_2$, respectively. The switches 53 and 54, represented schematically as two-pole switches, are electronic switches, controlled as later described.

The inputs to the second computing sections are by electrical circuits 33, 34, 35 and 36, as shown, which transmit in any suitable form (e.g., digitally, by resistance or by potential) the data set into the register 18a, the data elements being displayed by the previously mentioned visible digital wheels 18. The computed values of the desired distances are stored in the units Sp5 and Sp6.

The contents of the last stages of the first computer sections 21 and 22 are transmitted through circuits 37 and 38, respectively, to the first inputs of comparators $V_1$ and $V_2$, which receive at their second inputs the desired values from the last stages of the second computer sections 23 and 24 via circuits 39 and 40, respectively. Hence, $V_1$ compares the data in $Z_1$ with that in Sp6, and $V_2$ compares the data in $Z_2$ with that in Sp5. Each comparator has three output circuits, 41, 43 and 45, or 42, 44 and 46, which groups are respectively connected to the inputs of motor controllers Ms1 and Ms2. The comparators apply an indicating voltage to the central circuit 43 or 44 when an equality is sensed by the respective comparator, which signals the controller to stop the motor controlled thereby; apply an indicating voltage to the circuit 41 or 46 when the comparison shows the actual distance to be smaller than the desired value; and to apply an indicating voltage to the circuit 45 or 42 when the actual distance is greater than the desired value. The motor controllers sense these indicating voltages to apply, through circuits 31 and 32, voltages of proper polarity to drive the motors $M_1$ and $M_2$ in the directions to decrease the differences sensed in the comparators. The normally closed limit switches 13 and 14 are shown, in series with the power circuits to the motors.

The circuits 43 and 44, which indicate equalities, are further connected by circuits 47 and 48, respectively, to the inputs of an "and" gate 49, which emits a voltage in its output circuit 50 only when both $V_1$ and $V_2$ indicate equality. The circuit 50 is connected to an input 19b of the indicator 19 and, by a circuit 61, to an illumination controller 59 which has its other terminal connected by circuits 60 and 57 to the output of the unit $K_2$ of the computing section 24.

The indicator 19 may contain several wheels bearing readable indicia; however, it may alternatively comprise other number-generating devices, such as a cathode-ray tube, a glow-lamp tube like a nixitube, or a series of light-emitting diodes. The indicator also contains driving and/or decoding elements to cause the presentation of indicia giving the value of $m$, which is transmitted thereto through a circuit 63 leading from the circuit 33 and connected to its input terminal 19a. Further, the indicator includes a circuit for illuminating lamps and/or for powering the other number-generating device, having a repeating interruptor in series and connected to a source of power (not shown) for flashing or blinking the illumination of the lights and/or the number displayed. The interruptor is connected, by a control circuit, to the input 19b to cease interruptions and permit steady illumination and/or steady display of the number whenever the circuit 50 and the terminal 19b are energized.

Each motor has, upon a pole passage (i.e., the movement of its commutator past a brush) a change in the current flow, which alters the voltage drop across the resistance 29 or 30. These voltage changes are transmitted by the circuit pairs 25, 26 or 27, 28, to the units $U_1$ and $U_2$. These units sense the voltage changes and convert them into pulses of predetermined durations and potentials. The last-mentioned pulses correspond to movements of the carriers 6 respectively and 5, and are supplied via circuits 51 and 52 to electronic switches or gates, schematically shown at 53 and 54, these gates being controlled by voltages in the connected circuits 53a, 53b, 54a and 54b. The last four control circuits are connected to the output circuits 45, 41, 42 and 46, respectively. When a circuit 41 or 46, and hence a circuit 53b or 54b, is energized, the actual distance is smaller than the desired value, and the corresponding motor is turned in a direction to increase the actual distance of the carrier from the copy holder; hence, the electronic gates 53 and 54 are conditioned to add the pulses when the said circuits are energized, since the motors rotate in the directions to move the carriers away from the copy holder. Conversely, when the circuit 45 or 42, and, hence, circuit 53a or 54a, is energized, the gate 53 or 54 is conditioned to transmit a subtractive pulse to the unit $Z_1$ or $Z_2$. The actual additions and subtractions occur within the units $Z_1$ and $Z_2$.

The base or origin positions of the carriers, corresponding to their positions when the switches 15 or 16 are closed, are transmitted through circuit 55 or 56 to reset the corresponding counter $Z_1$ or $Z_2$ to the known (previously measured) distance of the respective carrier from the copy holder when the respective switch is closed. The terminals of these switches may, in this embodiment, be at ground potential. It should be noted that, since the carriers can move in both directions from the switches, the switches 15 and 16 and their contacts 6a and 5a should, in the preferred embodiments, be related to close the switches only through a short distance of travel of the carriers, preferably from one to a few hundredth of a millimeter. It is evident that the reset values in the counters $Z_1$ and $Z_2$ are equal to the actual values of $(A + B)$ and $A$, respectively. Thereby a base of starting count is given to these counters each time that a carrier closes a switch 15 or 16. The pulses from the unit $U_1$ and/or $U_2$ are added to or subtracted from these starting counts.

The section 24 of the computer has an input unit $K_2$ which has its input connected by the circuit 33 to receive the value $m$. This unit is an inverter and generates the reciprocal, $1/m$, which is transmitted to an addition unit $A_2$, as well as to the the circuit 57, previously described. The unit $A_2$ adds +1 to the received signal and transmits the sum to the storage unit $Sp2$; this stored sum equals $(1 + 1/m)$. This sum is transmitted to a multiplying unit $Mu2$, which has an additional input connected to the circuit 34, through which the value of $f$ is transmitted, and which multiples its inputs to generate the product $f(1 + 1/m)$; this product is stored in the unit $Sp4$. This quantity is transmitted to two destinations, of which the first is an adding unit $A_4$, wherein the quantity T, transmitted through the circuit 35, is added, preferably algebraically; the other destination is the the adding unit $A_3$, to be described. The sum $(a + T)$ produced by the unit $A_4$ is stored in the unit $Sp5$, always available for comparison in $V_2$ with the actual distance found by $Z_2$.

The section 23 includes an adding unit $A_1$ which receives the value $m$ through the circuit 33 and adds +1 thereto. The output from this unit, equal to $(1 + m)$, is transmitted to a storage unit $Sp1$ and, from there, to a multiplying unit $Mu1$, which received $f$ from the circuit 34 at another input and generates the product $f(1 + m)$; this product is stored in the unit $Sp3$. From $Sp3$ the product is transmitted to one of the three inputs of an adding unit $A_3$; the other two inputs are, respectively, connected to the circuit 58 and to the circuit 36 for receiving $a$ and $HH'$. The three inputs are added in this unit to generate the sum $(a + b + HH')$, which is stored in the unit $Sp6$ and is, therefore, always available for comparison in $V_1$ with the actual distance in $Z_1$.

The optional illumination controller is also an electronic digital computer and is connected to the circuits 57 and 50 by circuits 60 and 61. In controlling the intensity of illumination it is convenient to have in the computer the reciprocal $1/m$, and this is supplied from the unit $K_2$. Moreover, it is advantageous, when the light controller is provided, to signal illumination only after the camera has been set correctly, and this fact is known by the presence of a signal in the circuit 50. Energization of the lamps only when the signal appears prevents accidental illumination when the camera is not set correctly. The controller may include a time-delay element in the connection to the circuit 61 to prevent illumination upon a momentary indicating voltage when a motor overshoots, as is explained in the next paragraph. The lamps connected to the controller 59 are not shown.

It is advantageous to use motors $M_1$ and $M_2$ which stop quickly upon cessation of power and do not continue to turn by inertia. However, the apparatus is practicable even though the motors overshoot, since the comparators $V_1$ and $V_2$ sense the resulting deviations of the actual from the desired distances, thereby causing the controllers $Ms1$ and $Ms2$ to reverse the motors. Upon reversal, the motors turn only for shorter durations and, hence, have less inertial energy. Moreover, multi-pole motors, which produce more voltage pulses across the resistors 29 and 30 per motor revolution, than do motors having fewer poles are preferably used to improve the exactness of the camera setting.

Second embodiment

FIGS. 2 and 3 show a variant wherein the electrical pulses are generated in direct response to the rotations of the positioning shafts instead of by the motors. The shafts 11 and 12, are similarly connected to driving motors $M_1$ and $M_2$ which are mounted in a frame having a stationary base 1a, a column 2a and a platform 3a. The parts 5, 6, 5a, 6a, 15 and 16 are as previously described. The shafts 11 and 12 carry, for rotations therewith, discs 71 and 72 having all around their circumference, markings 70, which may extend radially and are magnetic or optical characters. Cooperating with these discs and mounted on the column 2a are sensing devices 73 and 74, which may include coils or, in the case of optical markings, sources of illumination and photocells. These devices emit a change in voltage each time that a marking 70 passes, and these voltages pulses are passed, by circuits corresponding to the pairs 25, 26 and 27, 28, to the converting units $U_1$ and $U_2$, the resistors 29 and 30 of FIG. 5 being not used.

In this embodiment, wherein the electrical pulses are generated directly in response to the movements of the positioning shafts 11 and 12, errros that may occur from deviations of motor and shaft rotations, as due to play between them, are eliminated. Further, there is eliminated a potential difficulty of the first embodiment that, when the desired and actual distances compared in $V_1$ and $V_2$ are sensed to be equal and the motors overshoot, no pulse may be generated until an unequal position is sensed; or a reversal of the polarity to reverse the motors may generate spurious pulses. Both can throw the counters $Z_1$ and $Z_2$ off from the correct values.

This embodiment can be used with the computer shown in FIG. 5, with the changes noted above, or with the computer to be described in connection with FIG. 6.

Third embodiment

FIG. 4 shows another variant, including a frame having a base 1b, a column 2b and a platform 3b, the parts 5, 5a, 6, 6a, 11, 12, 15, 16, $M_1$ and $M_2$ being as previously described. The column 2b has inscribed along its length a scale 75 with magnetic or optical graduations 76 which are closely spaced, being for clarity shown far apart. The carriers 6 and 5 carry detectors 77 and 78, respectively, which sense movements of the carriers relatively to the graduations and emit corresponding electrical pulses to the units $U_1$ and $U_2$ by circuits, not shown, but corresponding to those described for the second embodiment.

In this embodiment play, if any, between the positioning shafts and the carrier 5 and 6 does not affect the pulse counts, which always correspond to the true positions of the carriers. There is provided a further refinement in the precision of the camera setting, and, for a given precision of setting, the tolerances of the driving mechanism can be substantially reduced. Again, the computer of FIG. 5, modified as stated, or that of FIG. 6 may be used.

Modified digital computer

Referring to FIG. 6, there is shown a modified electronic digital computer 17a, wherein the reference numbers 13–16, 19, 21–24, 31–61, $M_1$, $M_2$, and the blocks representing the computing units, comparators and motor controllers are as was described for FIG. 5. A simplified input device 18b, which receives only the value of the magnification $m$, replaces the register 18a.

In this embodiment the data for the selected objective lens, such as $f$, T and HH', as well as the lens number, are given on separate, insertable data cards, e.g., punched cards or cards having magnetic markings, by means of a suitable code. Of course the lens number need not be in machine-readable indicia. While any number of such cards may be provided, only a limited number, from one to four or more, can be inserted into the computer at once; in the embodiment shown, three cards are shown at 80, 81 and 82. These cards are inserted into holders having means for reading the data and have output circuits 83, 84 and 85 for the data pertaining to $f$, T and HH', respectively, but only one of these cards is at any one time read. To determine the selected card, a switch 86, manually settable to one of its positions I, II and III is provided. Setting the switch 86 activates the reading of the corresponding card, and the switch is set each time that a new lens is attached to the carrier 5. The circuits 83, 84 and 85 are connected to the previously described circuits 34, 35 and 36.

FIG. 6 further shows how the electrical pulses generated in the sensing devices 73 and 74 of the second embodiment, indicating movements of the discs 71 and 72, are fed to the converters $U_1$ and $U_2$. The devices and converters are interconnected by circuit pairs 87, 88 and 89, 90.

Operation of the modified computer is as was previously described for FIG. 5, save for differences noted above and the absence of certain parts.

I claim:

1. Process for setting the enlargement and focus of a reproduction camera having replaceable objective lenses which may have different focal lengths, said camera including a copy holder, an objective lens carrier and a carrier of the image plane, said carriers being individually movable to different distances from the copy holder and being driven by separate electric motors, which includes the steps of:
    a. determining separately the actual distances of the carriers from the copy holder by generating an electrical pulse at each incremental change in the distance of a carrier from the copy holder and adding or subtracting the successive pulses in a separate counter for each carrier in a digital computer according to the direction of change,
    b. introducing into the computer at least the values of the desired magnification and the focal length of the selected objective lens,
    c. computing digitally and separately for each carrier the desired distance of the carrier from the copy holder on the basis of at least the desired magnification and the focal length of the selected lens,
    d. comparing separately the determined actual distances with the corresponding desired computed distances, and
    e. controlling the motors in accordance with the results of the comparisons to turn each motor individually in the direction to decrease the difference between each actual and the corresponding desired distance, and to stop each motor when the comparison shows the corresponding difference to be null.

2. Process according to claim 1 wherein said electric pulses are generated at successive pole passages of the motor commutators relative to their brushes.

3. Process according to claim 1 wherein said electric motors are coupled to positioning means for said carriers and the process involves generating said electric pulses directly upon each incremental movement of the positioning means.

4. Process according to claim 1 wherein said carriers are movable relatively to a frame and the process involves generating said electric pulses directly upon each incremental movement of a carrier.

5. Process according to claim 1 wherein said carriers have starting positions at predetermined distances from the copy holder, which includes the steps of resetting each counter to a value corresponding to a predetermined distance when the corresponding carrier is at its starting position, and thereafter adding the electrical pulses to or subtracting them from the said reset values.

6. Process according to claim 1 wherein the desired distances from the copy holder to the objective lens carrier, $a$, and to the carrier of the image plane, $(a + b)$, are computed in an electronic digital computer using the formulae:

$$a = f(1 + 1/m), \text{ and } (a + b) = f(1 + 1/m) + f(1 + m)$$

by the steps which include:

a generating the reciprocal $1/m$,
b. adding +1 to $1/m$ to obtain $a' = (1 + 1/m)$,
c multiplying $a'$ by $f$ to obtain $a = f \cdot a'$, d adding +1 to $m$ to obtain $b' = (1 + m)$.

e multiplying $b'$ by $f$ to obtain $b = f \cdot b'$, and f adding $a$ to $b$ to obtain $(a + b)$.

7. Process according to claim 6 which includes the steps of introducing into the computer the value of T and the value of HH' for the selected lens, correcting the values of $a$ and of $(a + b)$ by adding algebraically the value of T to the former and the value of HH' to the latter, and using the resulting corrected desired distances in the comparisons, T being the distance from the objective carrier to the principal of the lens and HH' being the distance between the two nodal points of the lens.

8. In combination with the steps recited in claim 6:

a. storing the computed desired distances and transmitting them to separate comparators, b. transmissing the determined actual distances to the corresponding comparators after each addition or subtraction of a pulse, and c. making said comparisons in said comparators.

9. A reproduction camera including a frame constructed to position a copy holder, a carrier for an objective lens, a carrier for the image plane, said carriers being independently movable relatively to the copy holder for altering their distances therefrom, separate electric motors having mechanical connections to the carriers for varying said distances, means for each carrier for generating an electrical pulse at each incremental change in one of said distances, and an electronic digital computer for setting the camera, comprising:

a. a pair of counters connected by circuit means respectively to said pulse-generating means for adding or subtracting the pulses according to the directions of changes of said distances, thereby to determine the actual distances of the carriers from the copy holder, b. means for introducing the desired magnification $m$ and the focal length $f$ of the objective lens, c. computing means including at least one computing section for computing the desired distances of the carriers from the copy holder on the basis of at least the values of $m$ and $f$, d. a comparator for each carrier, each comparator being connected to the counter of pulses for the respective carrier to receive the actual distance therefrom, and to the computing means to receive the desired distance for the respective carrier, said comparators being constructed to compare said actual and desired distances and having output circuit means which are energized to indicate which distance is greater or that the compared distances are equal, and e. a motor controller for each comparator connected to the output circuit means thereof and to the motor which drives the corresponding carrier, constructed to operate the respective motor in a direction to decrease the difference sensed in the comparator and to stop rotation of the motor when the comparison indicates that the distances are equal.

10. A reproduction camera according to claim 9 which includes means for signalling when the positions of the carriers are at starting positions which are at predetermined distances from the copy holder, and means for each counter responsive to the corresponding one of said signals for resetting each counter individually to the respective predetermined distance when a signal is emitted, whereby subsequent electrical pulses are added to or subtracted from the count to which the counter has been reset.

11. A reproduction camera according to claim 9 which includes electronic means for each counter connected to the output circuit means of the corresponding comparator for causing each pulse to be either added to or subtracted from the corresponding counter in accordance with the results of the comparison.

12. A reproduction camera according to claim 9 wherein said computer includes:

a. means for introducing the value of T and the value of HH', b. a unit for generating the reciprocal of $m$, c. four adding units, respectively for adding +1 to the reciprocal of $m$, for adding +1 to $m$, for adding the value of T to the product of $(1 + 1/m)$ and $f$, and for adding together the said product, the value of HH' and the product of $(1 + m)$ and $f$, d. two multiplying units for generating, respectively, the two aforesaid products, and e. storage units for storing the computed quantities resulting from the third and fourth additions, T being the distance of the objective lens from the objective carrier and HH' the distance between the nodal points of the lens.

13. A reproduction camera according to claim 9 which includes:

a. an "and" gate connected to parts of the output circuit means of both comparators which parts are energized when the comparators indicate equalities between the compared distances, said gate having an output circuit, whereby said output circuit is energized only when both comparators indicate equalities, and b. visible means for indicating when said output circuit is energized.

14. A reproduction camera according to claim 13 wherein the camera includes a register for receiving the value of $m$, the desired magnification, and said visible indicating means includes an indicator connected to the said output circuit of the gate and to the said register and contains:

a. means for displaying visible the value of $m$, and b. an interruptor connected in a power circuit for normally causing said display to be flashing, and means responsive to a signal in said output circuit for disabling the interruptor and presenting, thereby, a steady display of the value $m$ when said output circuit is energized.

15. A reproduction camera according to claim 13 in which said computing means includes a unit for generating the reciprocal $1/m$, said camera having an illumination controller which is connected both to said output circuit from the gate and to the output of said unit, said illumination controller being an electronic digital computer having the functions of:

a. computing the degree of illumination as a function which includes $1/m$ as an argument, and b. permitting illumination of the copy only when said output circuit is energized.

16. A reproduction camera according to claim 9 wherein said pulse-generating means include resistances connected in series with the power circuits from the motor controllers to the motors, the motors having several poles, commutators and brushes, for varying the potentials across said resistors upon each pole passage, and each resistor is connected to a corresponding counter through a converter which produces pulses of suitable durations and amplitudes and are connected to sense the potentials across said resistors.

17. A reproduction camera according to claim 9 which includes:
a. a positioning shaft for each carrier, drivenly coupled to the respective motors for positioning the carriers,
b. elements rotatable with said shafts and having indicia thereon, and
c. sensing devices for generating electrical pulses upon passage relatively thereto of said rotatable elements, said sensing devices constituting the said pulse-generating means.

18. A reproduction camera according to claim 9 which includes:
a. scale graduations on a rigid member extending in the direction of movement of the carriers, and
b. sensing devices for generating electrical pulses upon passage relatively thereto of said graduations, said sensing devices constituting the said pulse-generating means,
c. the said rigid member or the sensing devices being on the frame and the other being first to the two carriers, respectively.

19. A reproduction camera according to claim 9 wherein the means for introducing the value of $m$ includes an input device which is manually set, and the means for introducing $f$ includes:
a. a holder for receiving a card bearing, in machine readable indicia, the value of $f$, and
b. circuit means for transmitting the value of $f$ from the card to the computing means.

20. A reproduction camera according to claim 19 wherein said card bears, additionally and also in machine-readable indicia, the values of T and HH', T being the distance from the objective carrier to the objective lens and HH' the distance between the two nodal points of the lens, and the computer includes circuit means for transmitting the values of T and HH' from the card to the computing means.

21. A reproduction camera according to claim 20 which includes a plurality of said card holders, and switch means for selectively energizing the circuit means leading to one of the card holders for transmitting to the computer means only the data from the card in the selected holder.

* * * * *

UNITED STATES PATENT OFFICE
CERTIFICATE OF CORRECTION

Patent No. 3,832,058            Dated August 27, 1974

Inventor(s)   Eckart Gusovius

It is certified that error appears in the above-identified patent and that said Letters Patent are hereby corrected as shown below:

On the cover sheet item [73] should read -- Dr. Boger Duplomat Apparate KG, Wedel, Holstein, Germany --.

Signed and sealed this 14th day of January 1975.

(SEAL)
Attest:

McCOY M. GIBSON JR.            C. MARSHALL DANN
Attesting Officer              Commissioner of Patents